INVENTOR.
CARLOS D. GUTIERREZ
BY
ATTORNEY

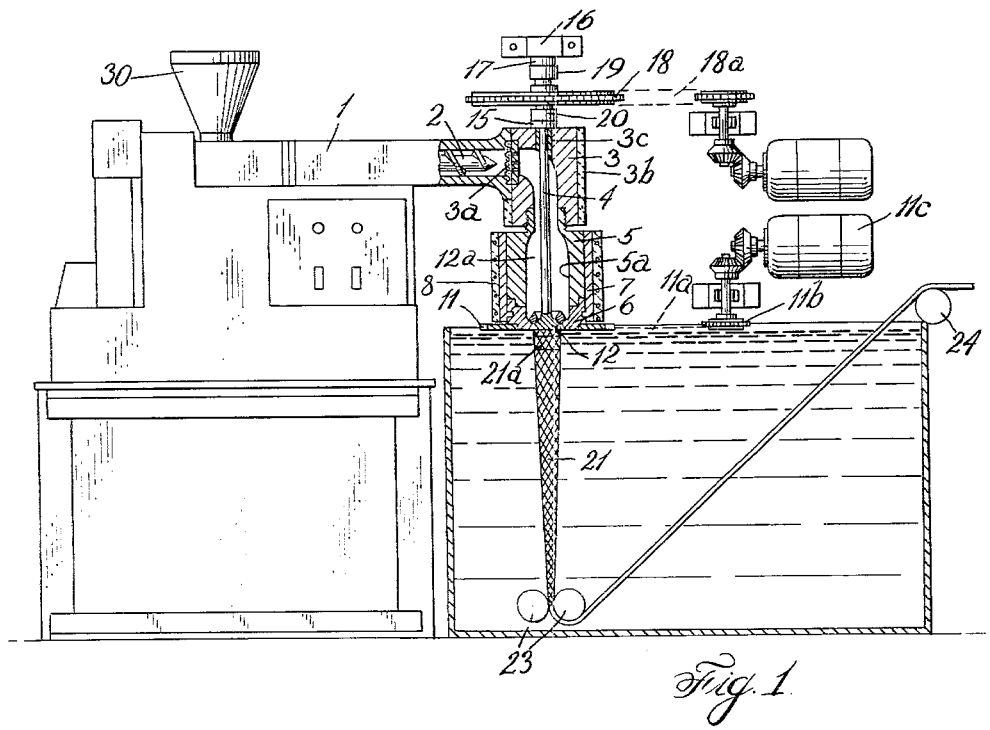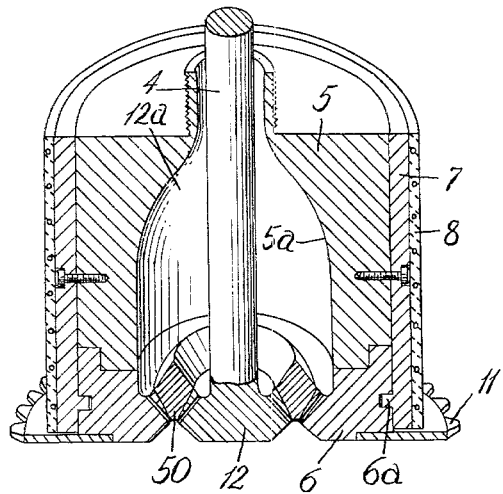

United States Patent Office 3,228,063
Patented Jan. 11, 1966

3,228,063
APPARATUS FOR EXTRUDING PLASTIC ARTICLES FROM DISPLACEABLE DIE MEMBERS
Carlos D. Gutierrez, Spartanburg, S.C., assignor to Union Carbide Corporation, a corporation of New York
Filed May 21, 1963, Ser. No. 281,934
7 Claims. (Cl. 18—12)

This invention relates generally to the extrusion of plastic articles and, more particularly, to an improved apparatus for the extrusion of plastic articles from relatively displaceable die members.

Heretofore, a number of plastic articles have been extruded from relatively displaceable die members. For example, United States Patent 2,919,467 to Mercer describes an apparatus for extruding plastic net from a pair of relatively displaceable die members having a plurality of strand-forming extrusion nozzles therein. The two die members are movably mounted in sliding contact with each other and are driven so that the strands extruded from one die member periodically cross the strands extruded from the other die member, thus welding the strands together and forming a finished plastic net. A similar apparatus is described in United States Patent 3,067,084 to Nalle.

Since the displaceable die members in devices such as those described above are in sliding contact with each other and are often driven at relatively high speeds, the die members usually have rather short lives due to wear on the sliding surfaces. Since the die members must be tooled to form the desired extrusion nozzles therein, they are usually costly to replace. Also, such frequent replacement naturally increases the down time of the particular machine involved.

It is, therefore, the main object of the present invention to provide an improved apparatus for extruding plastic articles from relatively displaceable die members with a minimum of wear on the die members.

It is another object of the invention to provide such an apparatus which substantially lengthens the life of the die members.

Others aims and advantages of the invention will be apparent from the following description and appended claims.

In the drawings:

FIG. 1 is an elevation view, partially in section, of a preferred form of extrusion apparatus for producing extruded plastic net from relatively displaceable die members and embodying the present invention;

FIG. 1a is a fragmentary perspective view of a portion of the apparatus of FIG. 1;

Figure 2:
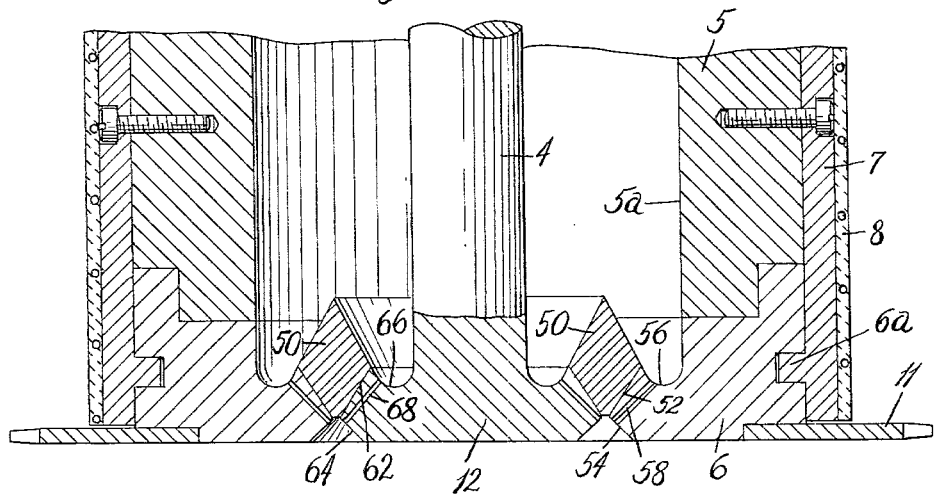
FIG. 2 is a detailed elevation view in section of the die members and bearing member in the apparatus of FIG. 1.

In accordance with the present invention, there is provided in apparatus for producing extruded plastic articles, which apparatus comprises a pair of relatively displaceable die members having extrusion nozzles therein, means for supplying pressurized molten plastic material to the upper surfaces of the die members so as to extrude the plastic material through the extrusion nozzles, and means for relatively displacing the die members transversely to the direction of extrusion, the improvement comprising a bearing member disposed between the die members and held in contact therewith by pressure from the molten plastic material to be extruded.

By providing a bearing member between the displaceable die members, this invention makes it possible to practically eliminate wear on the die members. Of course, the bearing member itself becomes worn, but the replacement of such a member is quick and inexpensive compared with replacement of the tooled die members. Moreover, it has unexpectedly been found that the bearing member can be held in place between the die members, even while they are moving at high speeds, by pressure from the molten plastic material being supplied to the die members of extrusion. In other words, the pressure of the molten plastic material permits the bearing member to "float" between the die members. Thus, the bearing member does not have to be mechanically attached to either of the die members, which greatly facilitates installation and replacement of the bearing member.

A preferred embodiment of the invention will be described in detail by referring to the drawings.

In FIG. 1, there is illustrated an apparatus for producing extruded tubular plastic net by the use of a pair of die members 6 and 12 having a plurality of strand-forming extrusion nozzles therein, and between which relative rotational displacement takes place transversely to the direction of extrusion.

The thermoplastic material to be extruded is contained in a hopper 30. From the hopper 30 extends a suitably mounted extruder barrel 1, in which an extruder screw 2 is mounted and continuously rotated to maintain a forced feed. The end of the barrel 1 discharges into a feed chamber 3 through a screen and breaker plate indicated at 3a. The chamber 3 is surrounded by an electrically heated jacket 3b or other heating means which maintains the plastic mass delivered by the screw 2 at an appropriate extrusion temperature. The upper end of the chamber 3 has a gland and bearing 3c for a vertical rotatable shaft 4, and the lower end is coupled to an extrusion chamber 5 by a screwthreaded neck or other suitable means for attachment. The two chambers 3 and 5 and the barrel are fixedly supported by a frame or base in any convenient manner.

The cavity of the chamber 5 has a wall 5a and supports an outer die member 6 in such a manner that the member 6 is capable of rotational movement about the axis of the shaft 4. For example, the lower end of the chamber 5 may be shaped to receive an upwardly directed annular flange provided on the die member 6, the externally peripheral wall of which is formed with a race groove 6a. A split cylinder or sleeve 7 is clamped around the chamber 5 so as to embrace the die member 6, thereby permitting the removal of the die member 6 for repair or replacement.

The cylinder 7 is electrically or otherwise heated by a jacket 8 and has an annular rib located in the groove 6a. The rib and groove serve as guiding and supporting race for the rotatable die member 6. The die member 6 may be rotated or oscillated by any suitable means; for instance, it may have secured to its underside a chain sprocket 11, the chain 11a of which is passed around another chain sprocket 11b which is driven through gearing from a suitable source of power 11c. The shaft 4 carries a replaceable inner or cross-like die member 12 which is continuously spaced apart from the outer die member 6 in the transverse direction.

The shaft 4 is hung on a ball or roller thrust bearing 15 above the bearing 3c of the feed chamber 3, and the upper extremity of the shaft is steadied in a bearing 16. A second thrust bearing is provided at 17. Between the two bearings a chain sprocket 18 is pinned to the shaft 4 as a convenient means for imparting rotatable movement to the shaft 4 and die member 12. The chain 18a may be driven by the same source which drives chain 11a, or by a different source. On each side of the chain sprocket 18 the shaft 4 is screwthreaded for pairs of die-setting locknuts 19 and 20. By the relative adjustment of these nuts, the appropriate space is maintained between the opposing surfaces of the die members 6 and 12.

Figure 3:
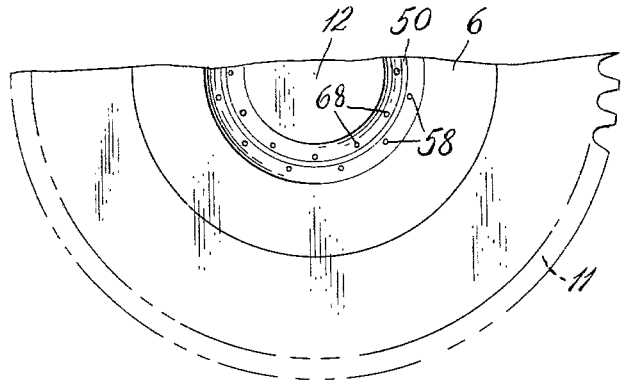
FIG. 3 is a partial plan view of the lower surfaces of the members shown in FIG. 2.

The die members 6 and 12 of the apparatus of FIG. 1 are shown more clearly in FIGS. 2 and 3. The outer die member 6 is an annulus of steel or some other hard and machinable material and is provided with an inner surface having an upwardly and outwardly sloping upper portion 52 and a downwardly and outwardly sloping lower portion 54. The annulus is also provided with an annular groove 56 in the inner periphery of the upper surface thereof. A plurality of strand-forming extrusion passages or nozzles 58 is arranged annularly in the die member 6 and extend downwardly and inwardly from the annular groove 56 through the die member 6 to the lower portion 58 of the inner surface.

The inner die member 12 is a disc of steel or some other hard and machinable material and is provided with an outer surface having an upper portion 62 sloping upwardly and inwardly at about the same angle as the upper portion 52 on the outer die member 6 and a lower portion 64 sloping downwardly and inwardly at about the same angle as the lower portion 54 on the outer die 6. The disc is also provided with an annular groove 66 in the outer periphery of the upper surface thereof. A plurality of strand-forming extrusion passages or nozzles 68 is arranged annularly in the die member 12 and extend downwardly and inwardly from the annular groove 66 through the die member 12 to the lower portion 68 of the inner surface.

The die members 6 and 12 are mounted in substantially the same horizontal plane with the opposing inner surfaces thereof continuously spaced apart in the transverse (radial) direction. Disposed between the spaced apart die members is an annular bearing member 50 having a substantially diamond-shaped cross section. As shown in FIG. 2, the bearing member 50 rests in the V-shaped groove formed by opposing surfaces 52 and 62 of the two die members. The bevels on the diamond-shaped bearing member 50 are made at the same angle as the sloping surfaces 52 and 62 of the died members so that the bearing member 50 is in continuous sliding contact with the die members, thus providing an effective seal between the spaced apart die members. Also, the bearing member 50 is made of a softer material than the die members 6 and 12, so that wear on the die members is practically eliminated. For example, if the two die members are made of steel, the bearing ring can be made of bronze, modified bronze, or any other suitable bearing material. Of course, the bearing member 50 is subject to wear, but the relatively simple bearing member is much easier to make and install than the relatively complex die members with the machined extrusion nozzles 58 and 68.

In the operation of the apparatus of FIGS. 1–3, the molten plastic mass formed in the pipe 1 is forced by the worm 2 into the feed chamber 3 and therefrom through the annular passageway 12a. As the pressurized molten plastic material arrives at the upper ends of the two sets of extrusion nozzles 58 and 68 in the died members 6 and 12, it is forced therethrough and is continuously extruded through the lower ends of the die orifices. As the two circles of plastic strands are being extruded, the two die members 6 and 12 are rotated in opposite directions, or otherwise rotationally displaced relative to each other, so that the two circles of strands periodically cross each other and become welded together. The result is a finished tubular net 21 with the inner circle of strands being integrally bonded to the outer circle of strands at the points of intersection.

During the extrusion operation, the bearing member 50 is held firmly in place in the V-shaped channel by the pressure of the molten plastic material being forced downwardly through the passageway 12a. In other words, the bearing member 50 floats on the opposed surfaces 52 and 62 of the die members without being mechanically attached to either member. As the die members 6 and 12 are rotated, the bearing member may remain stationary or, if desired, it can be made to follow the rotation of one of the die members, either at the same or a different speed, by causing the bearing ring to lock or partially lock to one of the died members. Interdependent factors which can be adjusted to control locking of the bearing ring to the die members are the angles of taper and nature of the mating surfaces of the bearing ring and the died members, the pressure of the molten plastic material being extruded, the particular materials used to make the bearing ring and the died members, and the speed of rotation of the die members. In cases where it is desired to prevent locking of the bearing ring to the die members, the included angle of the bottom apex of the bearing ring should be greater than about 15°.

In the apparatus of FIGS. 1–3, the relatively rotational movement of the die members may be effected in any of the following ways:

(1) The die members may be continuously rotated in opposite directions at the same or different speeds.

(2) The die members may be rotated in the same direction but at different speeds.

(3) The die members may be rotated in the same or opposite directions at varying speeds or with a stepwise movement.

(4) The die members may be oscillated so that the opposing nozzles periodically traverse each other.

(5) One of the die members may be held stationary while the other is rotated or oscillated.

The extruded net 21 is usually subjected to a setting or fixing treatment, by extrusion into air or by immersing in a cooling liquid immediately below the extrusion dies. Referring to FIG. 1, the aforedescribed extrusion apparatus is mounted over a bath of cooling liquid, which may be water or other liquid appropriate for setting the particular plastic mass being employed. Within the cooling bath or associated therewith, haul-off rolls or equivalent means are provided to take up the net. The extruded net 21 is drawn over a mandrel 21a to ensure an even haul-off and then passed through rollers 23 and pulled off in flattened form over a roller 24 to a suitable collecting means (not shown).

The floating bearing member may be disposed between the die members in a number of different ways. For example, instead of providing the die members with opposed tapering surfaces to form a V-shaped channel, the opposing surfaces of the die members may be made parallel and then provided with continuous recesses or grooves around the upper edges thereof; the bearing member is then made to conform to the shape of the channel formed by the opposed recesses. Alternatively, the bearing member can rest on the flat upper surfaces of the die members if upwardly protruding flanges are provided on the upper surfaces of the die members to hold the bearing member in place over the gap between the die members. The bearing member and the die members may obviously be provided with mating surfaces of any desired shape which permits relative displacement of the die members.

Figure 4:
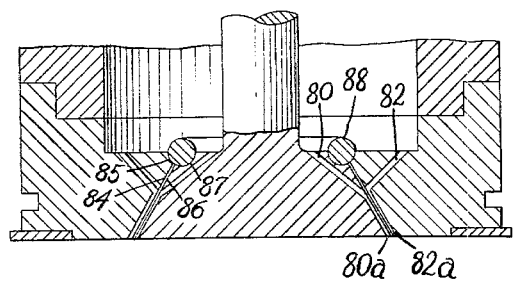
FIG. 4 is a detailed elevation view in section of modified die members and bearing member for use in the apparatus of FIG. 1.

The extrusion nozzles 58 and 68 in the die members of FIGS. 2 and 3 are set back from the opposing surfaces of the die members so that each nozzle is continuously isolated from the other nozzles, and the net is formed by crossing or contacting the extruded plastic strands at the die face or a predetermined distance away from the die face. As shown in FIG. 4, the present invention is also applicable to die members having extrusion nozzles 80 and 82 which are at least partially in the form of grooves or slits 80a and 82a which are mutually open when traversing each other during rotational oscillation of the die members, and are cut off from one another when traversing the solid slideways intervening between the spaced slots. In such a case, the net is formed by crossing and contacting the plastic strand-forming streams within rather than outside the die members. A preferred bearing member for this type of die construction is shown in FIG. 4. The upper edges of the opposing surfaces 84, 86 of the die members are provided with continuous recesses or grooves 85, 87, and a circular bearing member 88 made to conform to the shape of the semicircular channel formed by the opposed recesses 85, 87. The bearing member 88 is held in place in the semicircular channel by the pressure of the molten plastic material, as described above in connection with the bearing member 50 in FIGS. 1–3. The upper portions of the nozzles 80, 82 are tapered upwardly away from the opposing surfaces of the die members, in the same manner as nozzles 58 and 68 in FIGS. 2 and 3, so as not to interfere with the bearing member 88.

While various specific forms of the present invention have been illustrated and described herein, the same are susceptible of numerous modifications within the scope of the invention. For example, although the invention has been described with particular reference to circular dies for producing tubular net, the invention is equally applicable to linear dies for producing flat net. Moreover, it is possible to use more than two die members, as long as a bearing member is provided between each pair of die members. Also, this invention is not limited to the production of extruded plastic, but can be applied wherever a plastic article is extruded from two or more relatively displaceable die members.

As used herein the terms "plastic material" and "plastic mass" refer to:

(a) A synthetic thermoplastic resin capable of melt extrusion or compressing extrusion in a molten state through dies and settable by a cooling medium on issuance from the dies. Suitable thermoplastic materials include polyamides or superpolyamides, such as nylon; polyesters; vinyl polymers such as vinyl acetate polymers, styrene polymers, acrylonitrile polymers, vinyl chloride polymers such as polyvinyl chloride and copolymers of vinyl chloride with other ethylenically unsaturated monomers such as vinyl acetate, vinylidine chloride, and like monomers; polyolefins such as polyethylene, polypropylene, and like thermoplastic polymers.

(b) Natural or synthetic rubbers, subsequently vulcanized or containing vulcanizing agents.

(c) Those thermosetting plastic materials or mixtures thereof with thermoplastic materials, which are capable of melt extrusion.

(d) Natural and synthetic fiber-forming materials extrudable from solvent solution, such as cupramonium cellulose or protein material (e.g. from soya bean), cellulose acetate, as well as many thermoplastic resins mentioned above, dissolved or dispersed in a solvent and capable of extrusion and setting by immersion in or spraying with a coagulant as the plastic mass emerges from the dies.

(e) Foamable compositions containing any of the above materials.

What is claimed is:

1. In apparatus for extruding plastic articles, which apparatus comprises a pair of relatively displaceable die members having extrusion nozzles therein, means for supplying pressurized molten plastic material to the upper surfaces of said die members so as to extrude said plastic material through said extrusion nozzles, and means for relatively displacing said die members transversely to the direction of extrusion, the improvement comprising a bearing member disposed between said die members and held in contact therewith by pressure from the molten plastic material to be extruded.

2. The apparatus of claim 1 wherein said bearing member is made of a softer material than said die members.

3. Apparatus for producing extruded plastic net comprising:
   (a) a pair of relatively displaceable die members each of which has a plurality of strand-forming extrusion nozzles therein, said die members having opposed surfaces which are continuously spaced apart in the transverse direction and which are adapted to receive a floating bearing member;
   (b) means for supplying pressurized molten plastic material to the upper surfaces of said die members so as to extrude said plastic material through said extrusion nozzles in strand forming streams;
   (c) a bearing member disposed between said die members and held in contact with said opposed surfaces thereof by pressure from said molten plastic material;
   (d) and means for relatively displacing said die members transversely to the direction of extrusion so as to contact and separate adjacent members of said strand forming streams while maintaining said bearing means in contact with said opposed surfaces thereof.

4. The apparatus of claim 3 wherein said bearing member is made of a softer material than said die members.

5. The apparatus of claim 3 wherein said bearing member is made of bronze and said die members are made of steel.

6. Apparatus for producing extruded plastic net comprising:
   (a) a pair of relatively displaceable die members each of which has a plurality of strand-forming extrusion nozzles therein, said die members having opposed surfaces which are continuously spaced apart in the transverse direction and which taper upwardly away from each other so as to form a V-shaped channel therebetween;
   (b) means for supplying pressurized molten plastic material to the upper surfaces of said die members so as to extrude said plastic material through said extrusion nozzles in strand forming streams;
   (c) a bearing member mating with said V-shaped channel between said die members and held in contact with said opposed surfaces by pressure from said molten plastic material;
   (d) and means for relatively displacing said die member transversely to the direction of extrusion so as to contact and separate adjacent members of said strand forming streams while maintaining said bearing means in contact with said opposed surfaces thereof.

7. The apparatus of claim 6 wherein the included angle of said V-shaped channel is at least about 15°.

References Cited by the Examiner
UNITED STATES PATENTS

| | | |
|---|---|---|
| 2,226,940 | 12/1940 | Meyer et al. |
| 2,532,795 | 12/1950 | Underwood et al. |
| 2,919,467 | 1/1960 | Mercers _____ 18—12 |
| 3,089,804 | 5/1963 | Gutierrez _____ 18—12 X |

J. SPENCER OVERHOLSER, *Primary Examiner.*

ROBERT F. WHITE, *Examiner.*